United States Patent [19]

Rossberg

[11] Patent Number: 4,899,130

[45] Date of Patent: Feb. 6, 1990

[54] ELECTRIC DESIRED-VALVE INDICATOR

[75] Inventor: Rainer Rossberg, Schwalbach, Fed. Rep. of Germany

[73] Assignee: VDO Adolf Schindling AG, Frankfurt am Main, Fed. Rep. of Germany

[21] Appl. No.: 123,117

[22] Filed: Nov. 20, 1987

[30] Foreign Application Priority Data

Dec. 22, 1986 [DE] Fed. Rep. of Germany ....... 3643946

[51] Int. Cl.[4] ................................................ B60G 1/00

[52] U.S. Cl. .................................... 340/438; 340/635; 307/10.1

[58] Field of Search ...................... 340/507, 52 R, 438, 340/635, 445; 307/10 R, 10.1

[56] References Cited

U.S. PATENT DOCUMENTS 3,849,759 11/1974 Hosaka et al. .................... 307/10 R
4,098,542 7/1978 Rajput et al. ..................... 340/52 R
4,641,041 2/1987 Mattes et al. ..................... 307/10 R

*Primary Examiner*—Herbert Goldstein
*Assistant Examiner*—Jill D. Jackson
*Attorney, Agent, or Firm*—Martin A. Farber

[57] ABSTRACT

In an electric desired-value transmitter for automotive vehicles, particularly as electric gas pedal, having an actuating element and a potentiometer the wiper of which is coupled to the actuating element, a switch which is also coupled with the actuating element is connected to a comparison device to which the output voltage of the desired-value transmitter and at leasst one comparison voltage are fed. When the actuating element is in that position in which the switch is actuated, the comparison device is preferably fed two comparison voltages, one of which lines somewhat below the value of the output voltage which is given off by the desired-value transmitter upon proper operation and the other of which lies somewhat above said value.

5 Claims, 1 Drawing Sheet

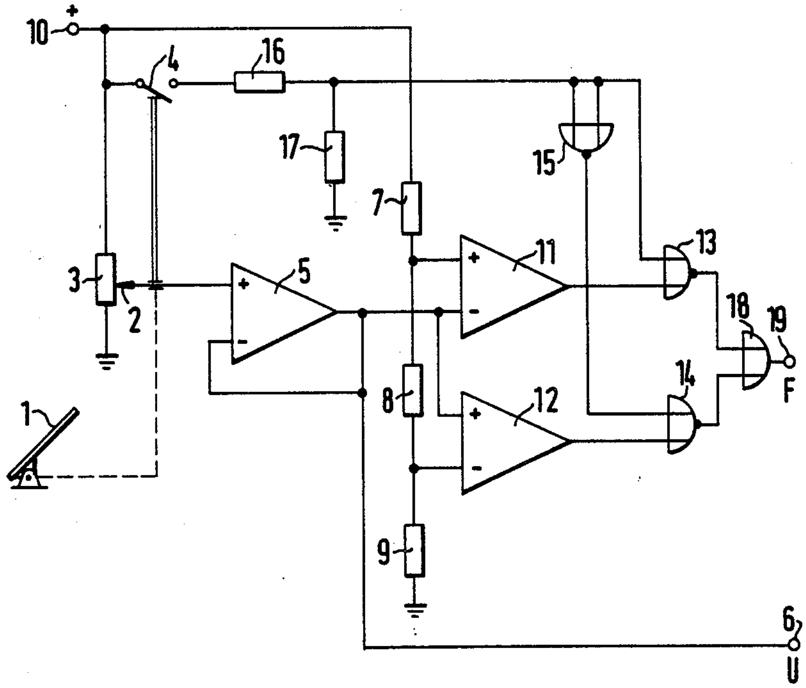
10
+
4
16
17
15
7
11
13
3
2
5
18
19
F
1
8
12
14
9
6
U

ELECTRIC DESIRED-VALVE INDICATOR

FIELD AND BACKGROUND OF THE INVENTION

The present invention relates to an electric desired-value transmitter for automotive vehicles, in particular an electric gas pedal connected by an actuating element to a potentiometer, the wiper of which is driven by the actuating element to develop an electric signal for control of fuel flow into an engine.

High demands as to reliability are made on electric desired-value transmitters for automotive vehicles since they frequently serve to control safety-relevant functions. This is true, in particular, of a desired-value transmitter for an electronic gas-pedal system. In that case it is important that errors which can occur despite high reliability be recognized and that suitable measures be taken, for instance, emergency operation introduced.

SUMMARY OF THE INVENTION

It is an object of the present invention to propose an electric desired-value transmitter which permits function monitoring.

According to the invention a switch (4) which is also coupled to the actuating element (1) is connected to a comparison device (items 11–18) to which the output voltage for the desired-value transmitter (3) and at least one comparison voltage are fed.

If, for instance, the switch is so coupled with the actuating element that it is actuated in an end position of the actuating element, then an error can be indicated when the output voltage is not at the corresponding end value.

A further development of the invention resides in the fact that, when the actuating element (1) is in that position in which the switch (4) is actuated, the comparison device (11–18) is fed two comparison voltages, one of which is somewhat below the value of the output voltage which is given off by the desired-value transmitter (3) upon proper operation,while the other is somewhat above said value.

By this further development, it is made possible that the switch need not be actuated directly at one of the end positions but, rather, the switch point can be arranged at a place in the adjustment path of the actuating element which is meaningful for the monitoring. The adjustment path is the path of displacement of the gas pedal. With an electric gas pedal, the switch point can lie preferably in the vicinity of the idling position.

An advantageous embodiment of the desired-value transmitter of the invention consists therein that for application of the comparison voltages there is provided a voltage divider which consists of three resistors (7,8,9), that the first comparison voltage is fed to a non-inverting input of a first comparator (11) and the second comparison voltage is fed to an inverting input of a second comparator (12), that the output voltage of the electric desired-value transmitter (3) is fed to the inverting input of the first comparator (11) and to the non-inverting input of the second comparator (12), and that the output voltages of the comparators (11,12) and the switch (4) are fed to a logic circuit (13,14,15,18).

In this connection, the logic circuit can preferably be developed in the manner that the logic circuit (13,14,15,18) is formed by two NOR circuits (13, 14) to one input of each of which there can be fed an output voltage of a comparator (11,12) and the other inputs of which are acted on, on the one hand, by the non-inverting output voltage of the switch (4) and, on the other hand, by the inverting output voltage thereof, and that the outputs of the NOR circuits (13,14) are connected together by an OR circuit (18).

BRIEF DESCRIPTION OF THE DRAWING

With the above and other objects and advantages in view, the present invention will become more clearly understood in connection with the detailed description of a preferred embodiment, when considered with the accompanying drawing, of which:

The sole FIGURE is a circuit diagram showing the electric-desired value indicator of the present invention.

DETAILED DESCRIPTION OF THE PREFERRED EMBODIMENT

The gas pedal 1 is coupled with a wiper 2 of a potentiometer 3 and a switch 4, which is indicated in the drawing merely in dashed line. In the idling position of the gas pedal, the wiper 2 is located at the lower end of the resistance path and it is pushed upward by actuation of the gas pedal 1. At 15% of the adjustment path the switch 4 is closed. Suitable mechanical devices for this purpose, for instance, drivers and cams are known per se and need not be explained in further detail in connection with the present invention.

The voltage tapped off by the wiper 2 is fed via a difference amplifier 5 connected as impedance convertor to an output 6 of the electric desired-value transmitter. The output 6 is available continuously for control of fuel flow to an engine (not shown). By means of a voltage divider which consists of the resistors 7,8 and 9, and is connected like the potentiometer 3 to the positive terminal 10 of a source of operating voltage, comparison voltages U1 and U2 are derived. The comparison voltage U1 amounts to 17% of the maximum value of the output voltage U, while the voltage U2 is 13%.

By means of the comparators 11, 12, the comparison voltages U1 and U2 are compared with the output voltage U of the desired-value transmitter. The output voltages of the comparators 11, 12 are fed to a respective input of one of the NOR circuits 13, 14. The other input of the NOR circuit 13 is acted on by the output signal of the switch 4, while the output signal of the switch 4, which is inverted by means of another NOR circuit 15, is present at the other input of the NOR circuit 14.

The output voltage of the switch 4 when the switch is closed has a relatively high (H) value corresponding to the logical value H or 1, and therefore at an adjustment path of 15% or more. For this purpose, the one contact of the switch is connected to positive operating voltage while the other contact of the switch is connected to a voltage divider 16, 17. A level corresponding to the logical circuit elements used in the specific case is obtained by means of the voltage divider.

The outputs of the NOR circuits 13, 14 are connected with an OR circuit 18, the output 19 of which represents an output for the error signal F. In the practical embodiment, a NOR circuit can of course be used instead of the OR citcuit 18, in which case the error signal is present in negated form. In the following, S is the output voltage of switch 4.

The following relationship applies for the error signal:

$$F=(U<U2\ \&\ SK=H)V(U>U1\ \&\ SK=L)$$

With a switch point of 15% as well as with U1=17% and U2=13% (referred to the maximum output voltage) an error is reported if the output voltage is less than 13% with switch closed and greater than 17% with switch open.

I claim:

1. In an electric desired-value transmitter for automotive vehicles, particularly for a vehicle having an electric gas pedal, the transmitter having an actuating element and a potentiometer, a wiper of the potentiometer serving as an output terminal of the potentiometer and being mechanically connected to the actuating element for providing an output voltage of the transmitter, the transmitter output voltage appearing at the output terminal of the potentiometer, the improvement being a failure detection circuit comprising:

a switching circuit including a switch mechanically coupled to the actuating element, the switch being actuatable by the actuating element within a predetermined operating range thereof and at a predetermined position thereof to switch from a first switch state to a second switch state wherein within the predetermined operating range of the actuating element, the switch is actuatable to enable the switching circuit to output logic voltages comprised of a first logic voltage during said first switch state and a second logic voltage during said second switch state;

a comparison device having a plurality of input terminals and being connected to the switching circuit to receive the logic voltages;

a reference circuit coupled to the comparison device and providing a first comparison voltage and a second comparison voltage different from said first comparison voltage;

the output voltage of the desired-value transmitter and said first and said second comparison voltages are fed to the comparison device via separate ones of said input terminals of the comparison device to enable the comparison device to produce a plurality of comparison signals designating a range of output voltage of the transmitter;

said comparison device includes a logic circuit responsive to the plurality of comparison signals and to the first and the second logic voltages to output a correspondence signal indicating a correspondence between ranges of transmitter output voltage and switch state to signal a failure when the desired-value transmitter output voltage falls outside the range designated by the switch state;

one of said comparison voltages is below a predetermined value of the output voltages which is given off by the desired-value transmitter upon proper operation while the other comparison voltage is above said predetermined value of the output voltage of the transmitter upon proper operation.

2. A transmitter according to claim 1, wherein said reference circuit comprises a voltage divider composed of three resistors connected serially for applying the comparison voltages to the comparison device, said first comparison voltage being provided at a junction of a first and a second of said resistors, said second comparison voltage being provided at a junction of said second and a third of said resistors; and wherein the comparison device further comprises a first comparator and a second comparator the first comparison voltage is fed to a non-inverting input of the first comparator and the second comparison voltage is fed to an inverting input of the second comparator, and the output voltage of the electric desired-value transmitter is fed to the inverting input of the first comparator and to the non-inverting input of the second comparator, and output voltages of said first and said second comparators serve as said comparison signals, the logic circuit being responsive to output signals of said first comparator and said second comparator and said switch to provide said correspondence signal signaling said failure.

3. A transmitter according to claim 2, wherein the logic circuit comprises two NOR circuits each having a first input and a second input, an output voltage of the first and the second comparators being fed respectively to the first input in a first and a second of said NOR circuits, the second inputs in said first and said second NOR circuits receiving respectively a noninverted output voltage of the switch and an inverted output voltage thereof; and wherein the logic circuit further comprises an OR circuit, outputs of the NOR circuits being connected to the OR circuit to provide an output signal of the comparison device.

4. An electric desired-value transmitter for automotive vehicles, particularly for a vehicle having an electric gas pedal, the transmitter comprising an actuating element and a potentiometer, a wiper of the potentiometer being mechanically connected to the actuating element, the wiper serving as an output terminal of the potentiometer and providing an output voltage of the transmitter;

a switch mechanically coupled to the actuating element, a state of the switch changing to an actuation state as a function of position of the actuating element;

a comparison device connected to the switch, and providing an output signal dependent on the switch state;

a reference circuit coupled to the comparison device and providing a first comparison voltage and a second comparison voltage different from said first comparison voltage; and wherein the output voltage of the desired-value transmitter and said first and said second comparison voltages are fed to the comparison device, the second comparison voltage being larger than the first comparison voltage, the value of said transmitter output voltage lying between values of said first and said second comparison voltages during absence of a failure in an operating condition of said transmitter; and said comparison device includes means for comparing said transmitter output voltage to said first and said second comparison voltages, said comparing means outputting a plurality of comparison signals designating a relative magnitude and said transmitter output voltage to said comparison voltages, said comparison device further including a logic circuit which is connected to said switch and evaluates logical state of the comparison signals in accordance with a state of said switch to output the output signal of the comparison device, the output signal of the comparison device serving as an error signal designating the presence of a failure when the output voltage of said transmitter lies outside a range of voltage defined by said first and said second comparison voltages and by a state of said switch.

5. A transmitter according to claim 4, further comprising means for generating reference voltages for said logic circuit, said generating means being connectable via said switch to a source of electric potential for altering said reference voltages as a function of said switch position.

* * * * *